US012112592B2

(12) United States Patent
Lingala et al.

(10) Patent No.: US 12,112,592 B2
(45) Date of Patent: Oct. 8, 2024

(54) SYSTEM AND METHOD OF DEVICE IDENTIFICATION

(71) Applicant: Carrier Corporation, Palm Beach Gardens, FL (US)

(72) Inventors: Ramesh Lingala, Hyderabad (IN); Suresh Raju Bethalam, Hyderabad (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/446,881

(22) Filed: Sep. 3, 2021

(65) Prior Publication Data

US 2022/0076514 A1    Mar. 10, 2022

Related U.S. Application Data

(60) Provisional application No. 62/706,756, filed on Sep. 9, 2020.

(51) Int. Cl.
*G07C 9/00* (2020.01)
*G07C 9/27* (2020.01)

(52) U.S. Cl.
CPC ..... *G07C 9/00912* (2013.01); *G07C 9/00309* (2013.01); *G07C 9/27* (2020.01)

(58) Field of Classification Search
CPC ... G07C 9/00912; G07C 9/00309; G07C 9/27
See application file for complete search history.

(56) References Cited

U.S. PATENT DOCUMENTS

| | | | |
|---|---|---|---|
| 10,339,738 B2 | 7/2019 | Hosey et al. | |
| 10,373,377 B1 | 8/2019 | Niewiadomski | |
| 10,410,303 B1 | 9/2019 | Catalano | |
| 10,607,084 B1 | 3/2020 | Tang et al. | |
| 2004/0049406 A1* | 3/2004 | Muncaster | G09F 9/00 |
| | | | 705/313 |
| 2004/0255623 A1* | 12/2004 | Sun | E05B 67/22 |
| | | | 70/38 A |
| 2014/0028443 A1* | 1/2014 | Ebner | E05B 39/04 |
| | | | 340/10.1 |
| 2017/0262800 A1* | 9/2017 | Dorpfeld | G06Q 10/08 |
| 2018/0159838 A1 | 6/2018 | Dintenfass | |

(Continued)

OTHER PUBLICATIONS

EP Application No. 21195610.7, Search Report, Feb. 2, 2022, 11 pages.

*Primary Examiner* — Nabil H Syed
(74) *Attorney, Agent, or Firm* — Seager, Tufte & Wickhem, LLP

(57) ABSTRACT

A system and method for identifying a lock box, including a lock box corresponding to a property, the lock box having a communication module embedded therein for wirelessly receiving, storing and communicating identifying information associated with at least one of the lock box and the property, and for controlling access to the property by providing a mechanical or electronic key to a user; a mobile device configured to receive at least one of the identifying information and an image representative of the identifying information, when the lock box and the mobile device are at a distance to communicate by one of Bluetooth®, infrared, NFC, Wi-Fi, Zigbee® and radio signals; and a server configured to communicate with at least one of the mobile device and the lock box.

12 Claims, 3 Drawing Sheets

(56) References Cited

U.S. PATENT DOCUMENTS

2019/0052638 A1    2/2019   Agarwal et al.
2019/0318541 A1*  10/2019   Sergott .................... G06T 11/00
2020/0157844 A1*   5/2020   Spath ................. G07C 9/00571

* cited by examiner

SYSTEM AND METHOD OF DEVICE IDENTIFICATION

CROSS REFERENCE TO A RELATED APPLICATION

The application claims the benefit of U.S. Provisional Application No. 62/706,756 filed Sep. 9, 2020, the contents of which are hereby incorporated in their entirety.

BACKGROUND

The subject matter disclosed herein generally relates to the field of lock boxes, and more particularly to a system and method for identifying a lock box associated with a wireless communication network.

Lock boxes are typically used to a provide a secured storage area for a key or other access aid at a location close to a locked property accessible by the key, or the lock box may be accessible through a mobile credentialing system. In this way, an authorized user can unlock the secured storage area, obtain the key and then use the key to unlock the locked property. The lock box is typically configured to require the user to demonstrate that he is authorized to obtain access to the lock box and the locked property before the secured storage area is unlocked to allow the user to obtain the key. In a mechanical lock box, the user might be required to enter a correct lock combination to access the secured storage area. In an electronic lock box, the user might be required to communicate a credential to the lock box (via a physical connection to the lock box or via a wireless link to the lock box) to access the secured storage area. Multiple lock boxes may be accessible to a single user when the proper credentials are presented.

Property that may be secured with a lock box includes real property (e.g., house, apartment or condominium, commercial building/office, storage unit) or other property (e.g., vehicles, marine vessels, heavy equipment, machinery) that is locked while unattended by a traditional lock that requires a key. For example, when a lock box is attached to real property, the lock box is typically attached to a door handle or to a nearby stationary object (e.g., a gate or handrail). However, there are situations, where multiple lock boxes may be encountered. For example, in a multi-unit building, there may be a plurality of lock boxes (e.g., attached to a rail near a public entrance), with each lock box corresponding to a different unit in the building. Trying to identify the lock box of interest among multiple lock boxes can be time-consuming, especially if the user must use a trial-and-error approach for determining the lock box of interest. What is needed then, is an improved method and system for identifying a lock box of interest, when presented with a selection of lock boxes.

BRIEF SUMMARY

According to one embodiment, a system for identifying a lock box, the system including a lock box corresponding to a property, the lock box having a communication module embedded therein for wirelessly receiving, storing and communicating identifying information associated with at least one of the lock box and the property, and for controlling access to the property by providing a mechanical or electronic key to a user; a mobile device configured to receive at least one of the identifying information and an image representative of the identifying information, when the lock box and the mobile device are at a distance to communicate by one of Bluetooth®, infrared, NFC, Wi-Fi, Zigbee® and radio signals; and a server configured to communicate with at least one of the mobile device and the lock box, the server including: a processing system comprising one or more processors; a lock box information database; and a memory system comprising one or more computer-readable media, wherein the computer-readable media contain instructions that, when executed by the processing system, cause the processing system to perform operations including: storing the identifying information in the lock box information database; associating the identifying information with at least one of the property and the lock box; receiving the identifying information from the mobile device; updating the lock box information database based on the identifying information received from the mobile device; generating an image comprising an augmented reality overlay, from the identifying information; and sending at least one of the identifying information and the image to the mobile device.

In addition to one or more of the features described above, or as an alternative, further embodiments may include the system for identifying a lock box, wherein the property includes at least one of commercial real property, residential real property, and non-real estate property comprising vehicles, marine vessels, heavy equipment, and machinery.

In addition to one or more of the features described above, or as an alternative, further embodiments may include the system for identifying a lock box, wherein the identifying information includes one or more of: lock box ownership; a unique identifier associated with at least one of the lock box, the mobile device, and the property; a geographic location of at least one of the property and the lockbox; at least one of an image, a video, an anchor point, and an external link associated with at least one of the lock box and the property; a geographic location of other lock boxes within a geographic area; and augmented reality content.

In addition to one or more of the features described above, or as an alternative, further embodiments may include the system for identifying a lock box, wherein the augment reality content includes at least one of text, graphics, pictures, still images, videos, illustrations, and external links, corresponding to at least one of the property and the lock box.

According to one embodiment, an apparatus including: a lock box corresponding to a property, the lock box having a communication module embedded therein for wirelessly receiving, storing and communicating identifying information associated with at least one of the lock box and the property, and for controlling access to the property by providing a mechanical or electronic key to a user, wherein the communication module is configured to communicate with a mobile device, and wherein the mobile device is configured to receive at least one of the identifying information and an image representative of the identifying information, when the lock box and the mobile device are at a distance to communicate by one of Bluetooth®, infrared, NFC, Wi-Fi, Zigbee® and radio signals.

In addition to one or more of the features described above, or as an alternative, further embodiments may include the apparatus wherein the property includes at least one of commercial real property, residential real property, and non-real estate property includes vehicles, marine vessels, heavy equipment, and machinery.

In addition to one or more of the features described above, or as an alternative, further embodiments may include the apparatus wherein the identifying information includes one or more of: lock box ownership; a unique identifier associated with at least one of the lock box, the mobile device, and the property; a geographic location of at least one of the property and the lockbox; at least one of an image, a video, an anchor point, and an external link associated with at least one of the lock box and the property; a geographic location of other lock boxes within a geographic area; and augmented reality content.

According to one embodiment, A method for identifying a lock box, the method including: deploying the lock box corresponding to a property; activating a lock box communication module for wirelessly receiving, storing and communicating identifying information associated with at least one of the lock box and the property; establishing a communication between a mobile device and at least one of the lock box and a lock management server, when the lock box and the mobile device are at a distance to communicate by one of Bluetooth®, infrared, NFC, Wi-Fi, Zigbee® and radio signals; receiving on the mobile device, the identifying information from at least one of the lock box and the lock management server; viewing on the mobile device, at least one of the lock box and the identifying information for identifying the lock box; and unlocking the lock box and obtaining a lock box key by selecting at least one of the lock box and the identifying information displayed on the mobile device.

In addition to one or more of the features described above, or as an alternative, further embodiments may include the method wherein activating the lock box, includes at least one of locking and unlocking, a lock box shackle.

In addition to one or more of the features described above, or as an alternative, further embodiments may include the method wherein activating the lock box, includes scanning at least one of a QR code and a bar code associated with the lock box, with the mobile device.

In addition to one or more of the features described above, or as an alternative, further embodiments may include the method wherein the property includes at least one of commercial real property, residential real property, and non-real estate property comprising vehicles, marine vessels, heavy equipment, and machinery.

In addition to one or more of the features described above, or as an alternative, further embodiments may include the method wherein the identifying information includes one or more of: lock box ownership; a unique identifier associated with at least one of the lock box, the mobile device, and the property; a geographic location of at least one of the property and the lockbox; at least one of an image, a video, an anchor point, and an external link associated with at least one of the lock box and the property; a geographic location of other lock boxes within a geographic area; and augmented reality content.

In addition to one or more of the features described above, or as an alternative, further embodiments may include the method wherein the augment reality content includes at least one of text, graphics, pictures, still images, videos, illustrations, and external links, corresponding to at least one of the property and the lock box.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

Figure 1:
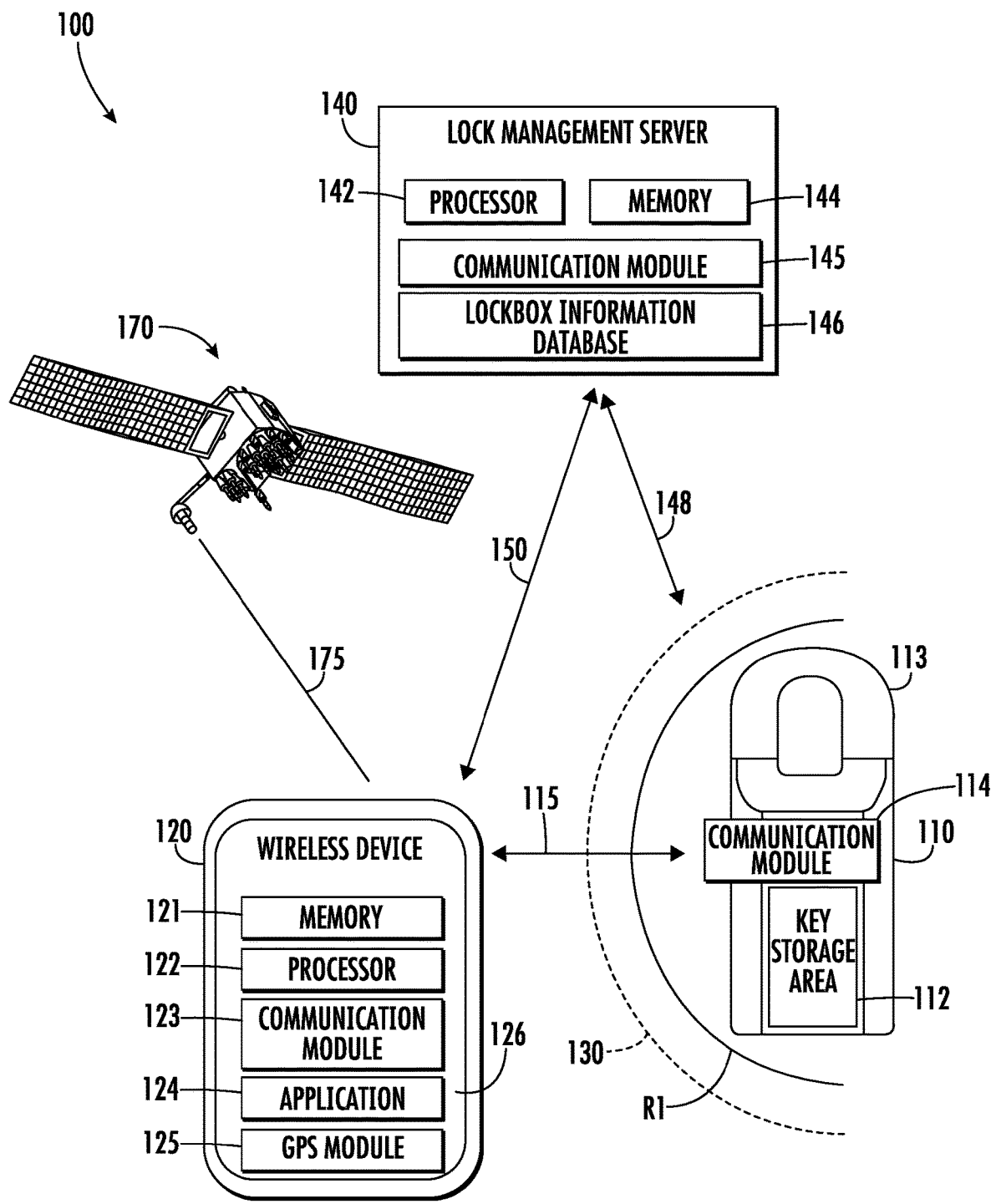
FIG. 1 illustrates a system to identify a lock box in accordance with embodiments of the disclosure.

Apparatuses (systems and devices) and methods are described herein for identifying lock boxes that are part of a wireless communication network. In general, a lock box may be used to secure a property, which may include real property or non-real estate property. Typically, lock boxes are used to secure real estate and are attached to a door handle or other convenient location so that the lock box is accessible by a user, such as a real estate agent, who has the key (e.g., a manual or electronic key) to open the lock box. In some situations, the user may encounter multiple lock boxes, but desires to only open one or several lock boxes of interest. This may result in the user having to apply a key or code to several lock boxes until he finds the one of interest. This trial-and-error approach can be confusing and time-confusing. Described below, is a system and method for identifying a lock box or a plurality of lock boxes, that may be in one-way or two-way communication with at least one of a mobile device and a server or a network of servers. The server may be a lock management server further described below, which provides a means for storing and processing data including "identifying information" associated with one or more lock boxes, and for transmitting to and receiving from a mobile device and/or a lock box, such identifying information which may be viewed on a mobile device in any form or format, including as artificial reality content as further described below.

"Identifying information" may include lock box ownership; a unique identifier associated with at least one of the lock box, the mobile device, and the property; information comprising geographic location of at least one of the property and the lockbox; images, videos, anchor points, and external links associated with at least one of the lock box and the property; geographic location of other lock boxes within a geographic area; and augmented reality content. Identifying information may be assigned by and stored in the lock management server, accessible to users and/or mobile devices that have authenticated server credentials (e.g., an authorized user or mobile device). For example, identifying information may include information associated with the lock box, including a description of the lock box (e.g., date/time/place deployed, by whom, lock box owner, etc.), or associated with the property corresponding to the lock box. Identifying information may also include location data based on a global positioning system (GPS) coordinate, street/city/state addressing information, current owner information, illustrations, pictures (still images or videos) of the property, external links, such as a property appraiser's website or a real estate multiple listing service, etc. In some embodiments, identifying information which may include the location of other nearby lock boxes within a geographic area. The geographic area may be defined by way of example, as a neighborhood, a pre-defined radius from the current lock box location or may be determined by geofencing techniques. For example, identifying information may include places of interest, such as nearby schools, places of worship, shops, etc. based on their proximity to the lock box location. Identifying information may also include augmented reality (AR) content. AR content may be identifying information observable as an overlay to the real-world image of the lock box, such as text, graphics, pictures, still images, videos, illustration and external links, and viewable on a mobile device, as further described below.

In one non-limiting embodiment, the identifying information may be viewed on a mobile device 120 when the mobile device and the lock box 110 are at a distance to communicate by way of short-range communication protocols as further described below. In some embodiments, the wireless communication between the mobile device and the lock box may be triggered by scanning a lock box QR code and/or bar code with the mobile device. When the lock box and/or the identifying information associated with the lock box is displayed on the mobile device, a user may select the lock box and/or identifying information to release a key stored in a key storage area 112.

The term "user" generally refers to a person (e.g., sales agent, broker, property manager, maintenance personnel, buyer, seller) who is authorized to attach or detach a lock box to a location, and/or to access a lock box for purposes of gaining access to a property. In some embodiments, a "user" may also include a person who has administrative rights (an "administrator") to the lock management server. The disclosed embodiments are applicable to various industries, including real estate, automotive, and heavy equipment, however, it should be evident to one skilled in the art that the present disclosure is not limited to the specific examples given.

Referring to FIG. 1, a schematic view of a system for identifying a lock box 100 in accordance with embodiments of the disclosure is shown. An exemplary lock box 110 has a shackle 113 for attaching the lock box to a property, such as to a door handle, and a key storage area 112 which contains the key for accessing the property. For example, a key storage area 112 may contain a door key, a key card, or fob, for accessing an apartment unit. The key storage area 112 typically has a cover (e.g., door) that is locked or secured with a lock mechanism.

In one non-limiting embodiment, the lock box 110 corresponds to a property, and has an embedded communication module 114 for wirelessly receiving, storing and communicating identifying information associated with at least one of the lock box 110 and the property, and for controlling access to the property by providing a mechanical or electronic key to an authorized user. The communication module 114, may include a circuit responsive to wireless communications from a mobile device 120 within the range of the lock box 110 and a transceiver (if implemented for two-way communication) or a receiver (if implemented for one-way communication), and an appropriate antenna.

The lock box communication module 114 is configured to provide access to the stored key, such as by unlocking the lock mechanism or other action, when a request for access is received from an authorized mobile device 120. The communication module 114 may also include logic or a controller that controls and coordinates the operation of the lock box 110 and a lock mechanism activation portion operable to enable operation of the lock mechanism. One function of the logic or controller is to process information from the mobile device 120 representing an identity of a user seeking access (such as a credential), determine whether access is authorized, and depending upon that determination, either grant access (i.e., by unlocking the lock mechanism) or deny access (i.e., by maintaining the lock mechanism in a locked state). In some embodiments, the lock box circuit includes a real time clock and a battery for the real time clock. In some embodiments, the communications module 114 may include a processor, a memory and/or a display or other type of indicator.

The lock box communication module 114 may include one or more devices or modules configured to communicate via point-to-point (e.g., device pairing), one-to-many (e.g., broadcasting) or mesh network, such as a Wi-Fi, ZigBee, and/or a Bluetooth® low energy communications (BLE) module and/or near-field communication (NFC) devices (e.g., RFID), NFC-enabled devices or NFC-equipped devices or ultra-wide band (UWB) enabled devices with UWB fixed stations, that can communicate with the mobile device 120 via communication module 123, and/or the lock management server 140 via communication module 145. In some embodiments, the lock box 110 may use or support the use of Bluetooth wireless communications, either instead of or in addition to IrDA communications capability. The lock box 110 may function with power received from a dedicated battery in the lock box 110.

In some embodiments, the communication module 114 includes a Bluetooth transceiver that periodically transmits a Bluetooth advertisement through an antenna. The communication module 123 of the mobile device 120 is configured to detect the Bluetooth advertisement. Once the Bluetooth advertisement is detected, the mobile device 120 may determine a received signal strength indicator (RSSI) of the Bluetooth advertisement and then determine an approximate distance between the mobile device 120 and the lock box 110 in response to the RSSI of the Bluetooth advertisement. A lock box 110 with wireless communications capability is shown in relation to a mobile device 120. The range of the lock box is shown schematically at 130. Thus, the mobile device 120 as shown in FIG. 1, is outside of the lock box's operating range 130, and would need to be moved within the range 130 to communicate with the lock box 110. Communications between the lock box 110 and the mobile device 120 may be two-way, as indicated by the two-way arrow representing a communications link 115 between the communication module 123 of the mobile device and the communication module 114 of the lock box. In some cases, one-way communication from the mobile device 120 to the lock box 110 may be sufficient. As further described below, the lock box 110 may also be in wireless communications with the lock management server 140.

The mobile device 120 may be a two-way communication device such as a mobile phone or "smart" phone or other type of telephone, a personal digital assistant (PDA), a personal computer or tablet device, or an augmented reality device, which may be a feature of any of the foregoing, or may be a separate device, such as an augmented reality headset (e.g., Google Glass, Microsoft HoloLens, etc.). The mobile device 120 may include a processor 122, memory 121, a communication module 123, and an application 124. The processor 122 can be any type or combination of computer processors, such as a microprocessor, microcontroller, digital signal processor, application specific integrated circuit, programmable logic device, and/or field programmable gate array. The memory 121 is an example of a non-transitory computer readable storage medium tangibly embodied in the mobile device 120 including executable instructions stored therein, for instance, as firmware. The communication module 123 may implement one or more communication protocols, such as, for example, short-range wireless protocols and long-range wireless protocols. Short-range wireless protocols 203 may include but are not limited to Bluetooth, Wi-Fi, HaLow (801.11ah), zWave, ZigBee, or Wireless M-Bus. Long-range wireless protocols may include but are not limited to cellular, satellite, LTE (NB-IoT, CAT MI), LoRa, Satellite, Ingenu, or SigFox. The communication module 123 may be in communication with at least one of the lock box 110, a GPS satellite 170 and the lock management server 140 via communication module 145. In some embodiments, the communication between the mobile device 120 and the lock box 110 may automatically occur when the mobile device and lock box are at a distance to communicate by short-range wireless communication. In another non-limiting embodiment, the communication may be user initiated, such as when the mobile device scans a QR or bar code on the lock box, or the user interacts with a lock box to activate a short-range wireless protocol such as by activating on a switch on the lock box (not shown).

The mobile device 120 may include an application 124 configured to generate a graphical user interface (GUI) viewable on a mobile device display 126. A user of the mobile device 120 may interact with the application 124 through the GUI. The application 124 may be computer software installed directly on the memory 121 of the mobile device 120 and/or installed remotely and accessible through the mobile device 120 (e.g., software as a service). In one non-limiting embodiment, the mobile device 120 may has augmented reality (AR) or virtual reality functionality (e.g., via one or more software modules). The AR functionality allows a user to view the lock box 110 through the mobile device display 126 (e.g., the real-world view), typically through the camera of the mobile device 120. The mobile device 120 may be configured, at least in part, to generate an image representative of the identifying information on the mobile device display 126 when the lock box and the mobile device are at a distance to communicate by one of Bluetooth®, infrared, NFC, Wi-Fi, Zigbee® and radio signals. The displayed image may be text, graphics, pictures, still images, videos, illustrations, external links, and/or AR content associated with the lock box 110 and/or the property. The AR content may be observable as image overlaying the real-world image of the lock box 110. The mobile device 120 is further configured to permit a user to interact with the lock box in view and/or the identifying information (e.g., through the camera view of the mobile device, or through application 124), which in some embodiments, will result in opening the key storage area.

The mobile device 120 may also include a GPS module 125 configured to communicate with a GPS satellite 170. The mobile device 120 may be in wireless electronic communication with the GPS via link 175. The application 124 may utilize the GPS module 125 to detect a location of the mobile device 120 and/or the lock box 110, and may also communicate with lock management server 140 to fetch GPS data of the property corresponding to the lock box. The GPS module 125 may be accurate within a first selected radius. Currently, GPS modules 125 within mobile devices are typically accurate to between 26-49 feet (8-15 meters) and thus the first selected radius may be between 26-49 feet (8-15 meters). However, it is understood that as GPS and similar satellite and terrestrial technology progresses the accuracy of the GPS modules 125 will improve and thus the embodiments described herein are also applicable to GPS modules 125 with first selected radii less than or greater than between 26-49 feet (8-15 meters). The location of the mobile device 120 and/or the lock box 110, may also be determined using other location detection methods, including, but not limited to, cell triangulation, over a mesh network, and/or detection of wireless signal strength (e.g., received signal strength (RSS) using Bluetooth, Wi-Fi, etc.).

In some embodiments, a lock box 110 may have a QR or bar code which may provide identifying information about the lock box and/or the property, when a mobile device 120 scans the code. For example, when the mobile device is in communication range of a lock box 110, the user may manually activate a mobile device camera to scan the QR or bar code which may then display identifying information. In some embodiments, the mobile device application 124 may request permission to enable or open a mobile device camera before the identifying information is available, or the mobile device camera may automatically launch when the mobile device is in communication range of the lock box 110. In an alternate or additional embodiment, AR content may be viewable when a QR code or a bar code associated with the lock box 110 is scanned by the mobile device 120. In this example, when the mobile device 120 is in communication range of the lock box, and the mobile device scans the QR code and/or the bar code, the mobile device 120 may automatically communicate with the lock management server 140, such that the lock management server 140 transmits all data necessary for viewing the AR content to the mobile device 120, as further described below.

The system 100 for identifying a lock box further includes a lock management server 140, which may be any type of computer device capable of managing lock box access information and communicating with mobile device 120 via a communications link 150 and/or communicating with lock box 110 via communications link 148. For example, communication module 145 can include a server-side network protocol application. The lock management server may be a cloud-based server, or network of servers. In some embodiments the lock management server 140 can represent a single computing device, while in further embodiments, the lock management server 140 can represent a plurality of computing devices interconnected via one or more communication networks.

The lock management server 140 includes a processor 142 communicating with a memory 144, such as electronic random-access memory, or other forms of transitory or non-transitory computer readable storage mediums. The memory 144 further including one or more computer-readable media, wherein the computer-readable media contain instructions that, when executed by the processing system, causes the processing system to perform operations including, storing the identifying information in the lock box information database 146, associating the identifying information with at least one of the property and the lock box, receiving identifying information from the mobile device, updating the lock box information database 146 based on the identifying information received from the mobile device, generating an image comprising an augmented reality overlay from the identifying information, and sending at least one of the identifying information and the image to the mobile device.

Processor 142 can execute control logic and perform data processing to perform the functions and techniques as discussed herein. For example, processor 142 can process lock box programming triggers and retrieve and set lock box status and use identifier information in the lock box information database 146 for authentication and/or credentialing related to authorized use of the communication network including of the lock management server, one or more lock boxes and one or more mobile devices.

The lock management server 140 includes a lock box information database 146 for storing identifying information; unique identifiers corresponding to at least one of a user, a mobile device, a lock box, a property, and digital certificate information. In some embodiments, the mobile device identifier information can include mobile device number, international mobile subscriber identity IMSI information, subscriber identity module SIM information, etc. In one non-limiting embodiment, the lock management server may be in communication with at least one of the lock box 110 and the mobile device 120 via communication modules 145, 123 and 114. In some embodiments, the lock management server, in communication with at least one of the lock box and the mobile device, may send and/or receive identifying information. The lock management server 140, may be configured to allow at least one of the mobile device 120 and the lock box 110, to update identifying information stored in the lock box information database 146.

In some embodiments, processor 142 can be configured to identify one or more lock box programming triggers. For example, a lock box programming trigger can include activating the locking mechanism of a lock box 110, such as by unlocking and/or locking a shackle 113 for the purpose of deploying the lock box (e.g., attaching it to a door handle). In this example, lock management server 140 in communication with at least one of the mobile device 120 and/or the lock box 110 determines that the shackle 113 of a lock box has been locked or unlocked. The locking or unlocking of a shackle 113, may automatically activate the communication module 114 permitting wireless communication between the lock box 110 and at least one of the mobile device 110 and the lock management server 140. The lock management server 140 in communication with the mobile device 120 and/or the lock box 110, may acquire and store identifying information associated with the deployment of the lock box (e.g., date, time, place, GPS coordinates, information related to the user and the mobile device, etc.). Thereafter, the user and any other users authorized by the administrator to access the lock box 110, will be permitted to access the key storage area 112, retrieve the stored key, and later return the key to the key storage area, thereby securing the key for use by subsequent users.

A lock box programming trigger can include a change in ownership of one or more lock boxes. An administrator accessing the lock management server 140 can add, remove, and transfer ownership of one or more lock boxes, causing a lock box device trigger. In certain embodiments, ownership of a plurality of lock boxes can be associated with ownership of a building containing a set of lock boxes. In another example, the ownership may be associated with an automotive or truck/heavy equipment dealership having a plurality of lock boxes used by a one or more dealerships for its mobile assets (vehicles, trucks, cars, heavy equipment, etc.).

Additionally, a lock box programming trigger can also include changing a list of authorized users for one or more lock boxes and/or changing access levels of one or more users. An administrator can add users to or remove users from a list of authorized users for a single lock box or for a plurality of lock boxes. Additionally, different users may be granted different levels of access to specific lock boxes, and such levels of access can be edited by an administrator. For example, in a typical real estate environment, companies or agencies may use a realtor (e.g., brokers/agents) or others to buy, sell or lease residential or commercial real property. In this example, an administrator may assign a unique identifier to the user and/or the lock box 110, and associate the user as an "owner" of the assigned lock box. The administrator may then grant the user/owner certain rights for accessing the lock box 110 and/or the lock management server 140, such as giving the user/owner permission to update the lock information database 146 to add a new address to the lock management server 140 when the lock box is deployed. For example, the user may be given permission to upload images or links to be associated with the lock box 110, such as pictures and views of a property for sale or rent so that the images may be viewed on a mobile device 120.

A programming trigger may also include an audible command from a user. For example, a user may use a voice command (or other biometric means of identification) to access the application 124. A voice command accessibility feature may be useful for a user who is physically disabled. An administrator accessing the lock management server 140, may authorize a user to access at least one of the lock management server 140 and/or a lock box 110 based on voice authentication. Voice authentication may be achieved by a variety of methods, including matching the user's voice input to the mobile device 120, to information stored on the lock management server (e.g., the lock box information database 146).

In one non-limiting embodiment, the lock management server 140 may be configured to generate an image comprising an augmented reality overlay from the identifying information. In general, the augmented reality overlay permits a user to view identifying information in augmented reality (e.g., AR content). An augmented reality overlay may include subject matter (e.g., text, graphics, illustrations, animation) positioned over or super-imposed upon, or blended with, a real-world image (or video) which may be viewable for example, through a mobile device. For example, referring to FIG. 2, a plurality of lock boxes 204, 206 may be viewed through a mobile device such that identifying information may be displayed as AR content illustrated by the "listing name" and "listing address" adjacent to the real-world view of the lock boxes.

The lock management server 140 in communication with at least one of the mobile device 120 and the lock box 110, may permit a user to view identifying information such as GPS location of the lock box, through the application 124 of the mobile device 120. The location of the lock box 110 may be accurate within a first selected radius R1, thus when the individual is looking for the lock box 110 proximate to or within that first selected radius R1 of the lock box 110 the lock box may still be difficult to find, thus the application 124 may begin to search for a Bluetooth advertisement of the lock box 110 to further pinpoint the location of the lock box 110. The first selected radius R1 may be inside or outside the Bluetooth range 130 of the lock box 110. The first selected radius R1 is illustrated in FIG. 1 as being circumferentially around that the lock box 110 because the first selected radius R1 is established at the time that the lock box 110 is installed using the mobile device 120 and at this time of installation the mobile device 120 will be next to (i.e., proximate) the lock box 110.

In some embodiments, lock management server 140 may generate and/or associate a GPS and/or an artificial reality anchor point, with the lock box 110, such as when a lock box is attached to a property. An anchor point or anchor tag, is an encoded software link that enables users to "jump" to a specific page or point on a page, or an image. For example, a map location that may display a street address and/or GPS coordinates, or an image anchor may launch an image that may be stored on the lock management server 140, or some other remote storage device, such as via a redirected link to another server where the image may be stored. Once the anchor is created, and identifying information (e.g., property location, address, images, etc.) is stored in the lock box information database 146, a user may view the lock box 110 through a mobile device 120 and at the same time, the identifying information and/or an anchor point will also be viewable on the display 126.

Figure 2:
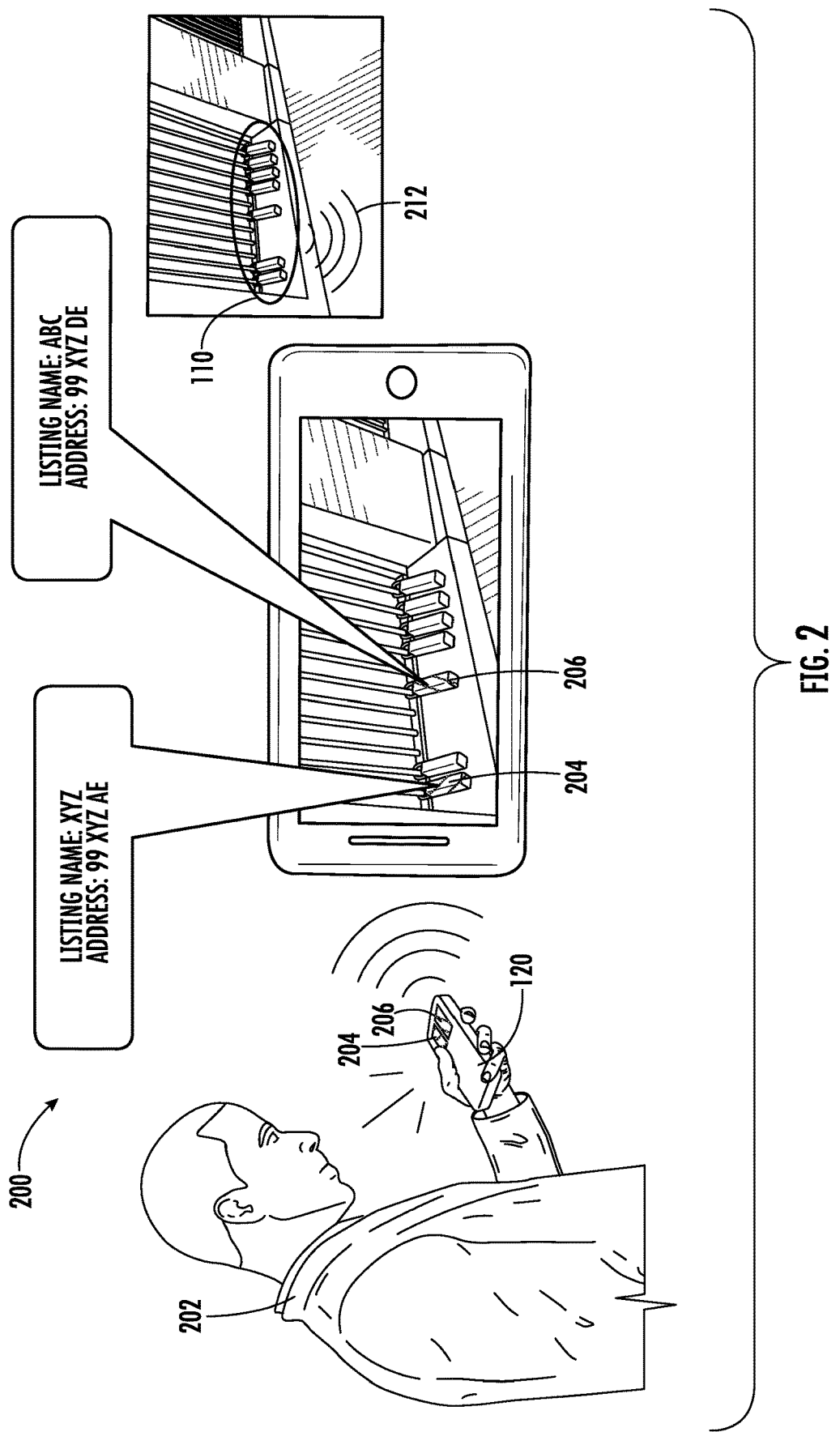
FIG. 2 illustrates a partial schematic view of system to identify a lock box in accordance with embodiments of the disclosure.

In another non-limiting embodiment, the lock management server 140 in communication with at least one of the lock box 110 and the mobile device 120, may permit the mobile device 120 to fetch a lock box BLE tag information from the lock management server 140. Fetching may occur for example, when a user 202 scans the QR or bar code of a lock box 110 with the mobile device 120 and application 124. In this example, a user 202 may deploy a lock box 110 by attaching the lock box to a property, such as a multi-unit condominium building. Once the lock box 110 is deployed, the mobile device 120 may prompt for a tag (e.g., BLE/UWB) to be added. A tag may include a visual alert displayed on the mobile device, as illustrated in FIG. 2, 204, 206. When the user 202 scans the lock box 110 using, for example, the "camera view" of a mobile device 120, the lock management server 140 may prompt identifying information, such as address of the property. The lock management server 140 in communication with the mobile device 120 through the application 124, may then authenticate at least one of the user, the mobile device 120 and the lock box 110 using, in part, the tag information. When authentication is complete, the user may access the lock box 110 as further described below.

Referring to FIG. 2, a partial view of the system 100 for identifying a lock box is shown. A plurality of lock boxes 110 are shown attached to a central location, such as a gate outside of a multi-unit apartment building. The lock boxes 110 may advertise a Bluetooth signal 212 detectable by the mobile device 120, as the mobile device 120 is within range of the advertised signal. As the mobile device 120 is within range of the lock box 110, the mobile device may prompt an alert indicating that a lock box is within range. The alert may be a visual indicator or an audible indicator which may be accessible through the application 124. In some embodiments, the application 124 may launch when the mobile device 120 detects a nearby lock box 110, or may require the user 202 to launch the application 124 manually. When the application 124 is open, the user 202 may view the lock boxes through the mobile device display 126, as illustrated in 208. For example, upon launching the application 124, lock boxes that the user 202 is authorized to access, may display a visual indicator (e.g., 204, 206). The application 124 may also permit the user 202 to view identifying information, such as an address associated with a lock box 110, as illustrated in 208. The user 202 may then select the lock box of interest through the mobile device (e.g., application 124). Selecting a lock box through the application 124, may be a programming trigger that will unlock the key storage area 112 permitting the user 202 to access the key.

Figure 3:
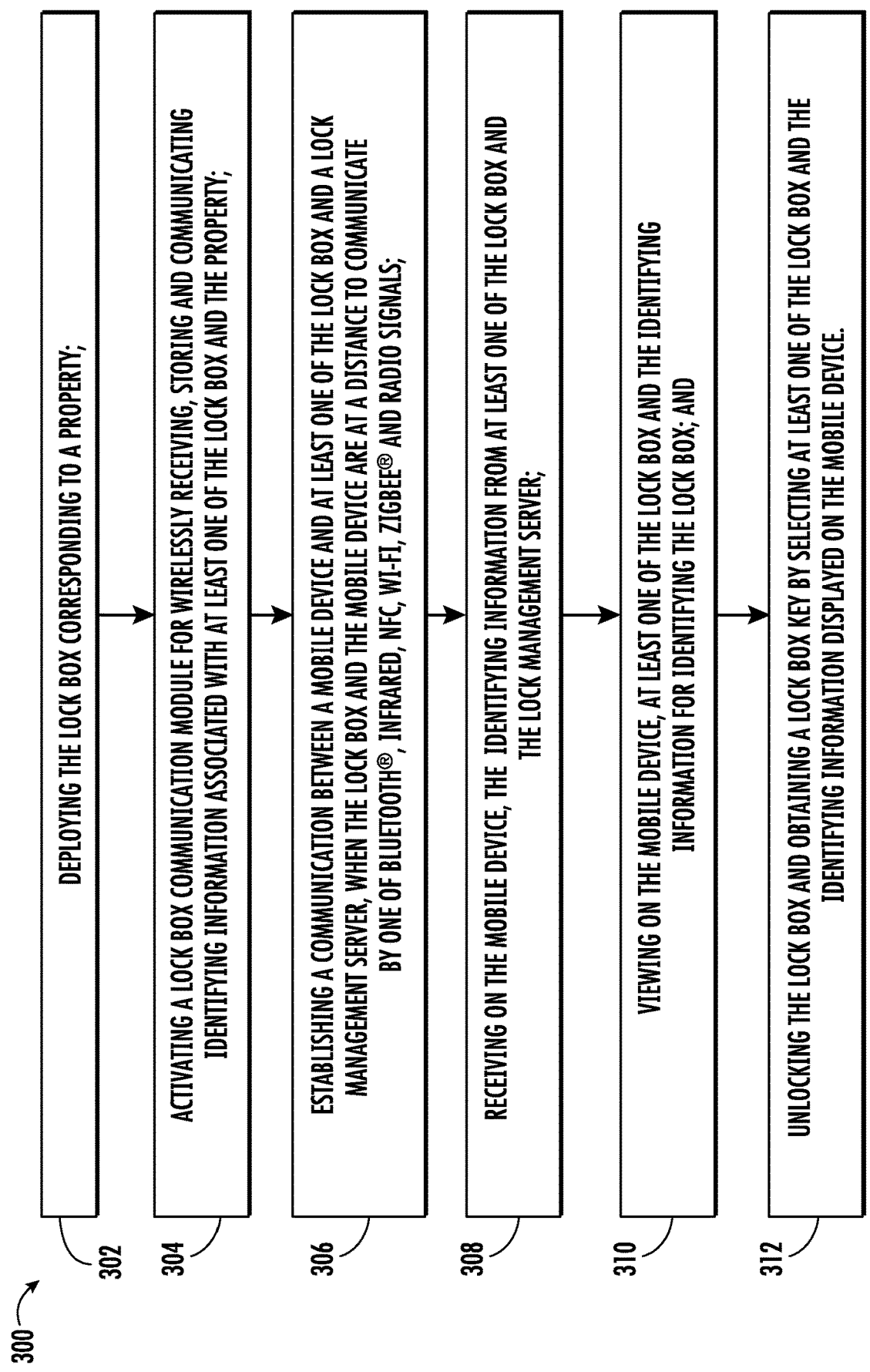
FIG. 3 is a flow diagram illustrating a method of identifying a lock box of FIGS. 1 and 2, according to embodiments of the disclosure.

Referring now to FIG. 3, with continued reference to FIGS. 1 and 2. FIG. 3 shows a flow chart of a method 300 for identifying and accessing a lock box according to embodiments of the disclosure. The method begins with a lock box 110. In step 302, a user 202 reaches a destination (e.g., a multi-unit apartment building) and deploys the lock box 110 by unlocking and/or locking a lock box shackle 113.

In step 304, the locking and/or unlocking of the shackle 113, activates (turns on) the lock box communication module 114. Activating the lock box communication module permits to lock box 110 to wirelessly receive, store and communicate identifying information associated with at least one of the lock box and the property. In some embodiments, the communication module 114 of the lock box 110 may be manually activated (e.g., an ON/OFF switch or reset switch).

In step 306, activating the communication module 114, establishes a communication between the mobile device and at least one of the lock box and a lock management server, when the lock box and the mobile device are at a distance to communicate by one of Bluetooth®, infrared, NFC, Wi-Fi, Zigbee® and radio signals. Once communication is established, the user 202 may interact with the lock box 110 via a mobile application 124 accessible through the mobile device 120. For example, as part of the lock box deployment, the user 202 may desire to associate identifying information with at least one of the property and the lock box 110. If the user 202, the mobile device 120 and/or the lock box 110 have not been previously authenticated by the lock management server 140, the user will be denied access until authentication has been satisfied. When the identifying information has been updated, the lock management server 140 may also wirelessly communicate the updated information to the mobile device of users associated with the lock box 110. For example, if a user 202 and/or mobile device 120 has been previously authenticated by the lock management server 140, the user need not be in range of the lock box 110 to make changes to the identifying information, or to receive automatic updates to identifying information. For example, a real estate agency broker (a user) may be associated with a plurality of listing agents (users) who are deploying multiple lock boxes on behalf of the agency each day. As each listing agent deploys a lock box, and the lock box is authenticated by the lock management server 140, the lock box may also be associated with a broker who may be pre-authenticated to receive automatic updates of identifying information pertaining to each lock box.

In step 308, when a communication between the lock box 110 and the mobile device 120 is established, the mobile device may receive identifying information from at least one of the lock box 110 and the lock management server 140. In some embodiments, the mobile device will automatically receive the identifying information. In another non-limiting embodiment, the mobile device 110 may receive the identifying information by scanning a QR or bar code associated with the lock box. In this embodiment, scanning triggers a communication between the mobile device and the lock management server 140 and/or the lock box 110.

In step 310, at least one of the lock box 110 and the identifying information may be viewed on the mobile device. The identifying information may be available for viewing through the mobile device in any form or format (e.g., text, graphics, illustration, etc.). In one non-limiting embodiment, the lock box and the identifying information may be viewed simultaneously, wherein the identifying information is displayed as an augmented reality overlay for identifying a lock box.

In step 312, the user may unlock the lock box 110 and obtain a lock box key by selecting the lock box and/or identifying information displayed on the mobile device 120.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media, such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

We claim:

1. A system for identifying a lock box, the system comprising:
   a lock box corresponding to a property, the lock box having a communication module embedded therein for wirelessly receiving, storing and communicating identifying information associated with the lock box and the property, and for controlling access to the property by providing a mechanical or electronic key to a user, wherein the communication module is configured to be activated responsive to locking and/or unlocking a lock box shackle;
   a mobile device configured to communicate with the communication module of the lock box when the lock box and the mobile device are at a distance to communicate by one of Bluetooth®, infrared, NFC, Wi-Fi, Zigbee® and radio signals, wherein responsive to establishing communication with the lock box, the mobile device receives the identifying information and an image comprising an augmented reality overlay representative of the identifying information; and
   a server configured to communicate with the mobile device and the lock box, the server comprising:
      a processing system comprising one or more processors;
      a lock box information database; and
      a memory system comprising one or more computer-readable media, wherein the computer-readable media contain instructions that, when executed by the processing system, cause the processing system to perform operations comprising:
         storing the identifying information in the lock box information database;
         associating the identifying information with the property and the lock box;
         receiving the identifying information from the mobile device;
         updating the lock box information database based on the identifying information received from the mobile device;
         generating an image comprising an augmented reality overlay, from the identifying information; and
         sending the identifying information and the image, comprising the augmented reality overlay, to the mobile device.

2. The system of claim 1, wherein the property comprises at least one of commercial real property, residential real property, and non-real estate property comprising vehicles, marine vessels, heavy equipment, and machinery.

3. The system of claim 1, wherein the identifying information comprises one or more of: lock box ownership; a unique identifier associated with at least one of the lock box, the mobile device, and the property; a geographic location of at least one of the property and the lockbox; at least one of an image, a video, an anchor point, and an external link associated with at least one of the lock box and the property; a geographic location of other lock boxes within a geographic area; and augmented reality content.

4. The system of claim 3, wherein the augment reality content comprises at least one of text, graphics, pictures, still images, videos, illustrations, and external links, corresponding to at least one of the property and the lock box.

5. An apparatus comprising:
   a lock box corresponding to a property, the lock box having a communication module embedded therein for wirelessly receiving, storing and communicating identifying information associated with at least one of the lock box and the property, and for controlling access to the property by providing a mechanical or electronic key to a user, wherein
      the communication module is configured to be activated responsive to locking and/or unlocking a lock box shackle,
      the communication module is configured to communicate with a mobile device
      when the lock box and the mobile device are at a distance to communicate by one of Bluetooth®, infrared, NFC, Wi-Fi, Zigbee® and radio signals, and
      wherein, responsive to establishing a communication between the lock box and the mobile device, the mobile device is configured to receive the identifying information and an image comprising an augmented reality overlay representative of the identifying information.

6. The apparatus of claim 5, wherein the property comprises at least one of commercial real property, residential real property, and non-real estate property comprising vehicles, marine vessels, heavy equipment, and machinery.

7. The apparatus of claim 5, wherein the identifying information comprises a geographic location of other lock boxes within a geographic area.

8. A method for identifying a lock box, the method comprising:
deploying the lock box corresponding to a property;
activating, a lock box communication module for wirelessly receiving, storing and communicating identifying information associated with the lock box and the property, wherein activation of the communication module is responsive to locking and/or unlocking a lock box shackle;
establishing a communication between a mobile device and the lock box and a lock management server, when the lock box and the mobile device are at a distance to communicate by one of Bluetooth®, infrared, NFC, Wi-Fi, Zigbee® and radio signals;
receiving on the mobile device, the identifying information and an image, comprising an augmented reality overlay, representative of the identifying information from at least one of the lock box and the lock management server;
viewing on the mobile device, at least one of the lock box and the identifying information for identifying the lock box; and
unlocking the lock box and obtaining a lock box key by selecting at least one of the lock box and the identifying information displayed on the mobile device.

9. The method of claim 8, wherein activating the lock box, comprises scanning at least one of a QR code and a bar code associated with the lock box, with the mobile device.

10. The method of claim 8, wherein the property comprises at least one of commercial real property, residential real property, and non-real estate property comprising vehicles, marine vessels, heavy equipment, and machinery.

11. The method of claim 8, wherein the identifying information comprises one or more of: lock box ownership; a unique identifier associated with at least one of the lock box, the mobile device, and the property; at least one of an image, a video, an anchor point, and an external link associated with at least one of the lock box and the property.

12. The method of claim 8, wherein the identifying information comprises augmented reality content, the augmented reality content comprising at least one of text, graphics, pictures, still images, videos, illustrations, and external links, corresponding to at least one of the property and the lock box.

* * * * *